United States Patent
Park et al.

(10) Patent No.: US 8,730,353 B2
(45) Date of Patent: May 20, 2014

(54) METHOD OF CONTROLLING ADAPTIVE AUTO EXPOSURE BASED ON ADAPTIVE REGION WEIGHT

(75) Inventors: Soo Jin Park, Seoul (KR); Deepak Chandra Bijalwan, Bangalore (IN)

(73) Assignee: LG Innotek Co., Ltd., Seoul (KR)

( * ) Notice: Subject to any disclaimer, the term of this patent is extended or adjusted under 35 U.S.C. 154(b) by 275 days.

(21) Appl. No.: 13/180,870

(22) Filed: Jul. 12, 2011

(65) Prior Publication Data

US 2013/0002941 A1 Jan. 3, 2013

(30) Foreign Application Priority Data

Jun. 29, 2011 (KR) .......................... 10-2011-0063819

(51) Int. Cl.
H04N 5/228 (2006.01)

(52) U.S. Cl.
USPC ........................................ 348/234; 348/229.1

(58) Field of Classification Search
None
See application file for complete search history.

(56) References Cited

U.S. PATENT DOCUMENTS

| 6,831,696 B1* | 12/2004 | Saeki ............................ 348/362 |
| 7,796,831 B2* | 9/2010 | Tanaka ........................ 382/274 |
| 2002/0080247 A1* | 6/2002 | Takahashi et al. ............ 348/229 |
| 2004/0207734 A1* | 10/2004 | Horiuchi .................... 348/229.1 |
| 2007/0024721 A1* | 2/2007 | Rogers ....................... 348/229.1 |
| 2007/0211959 A1* | 9/2007 | Hayaishi ....................... 382/274 |
| 2008/0316355 A1* | 12/2008 | Fukugawa et al. ............ 348/364 |
| 2010/0134650 A1* | 6/2010 | Kim et al. .................. 348/229.1 |

* cited by examiner

Primary Examiner — Luong T Nguyen
Assistant Examiner — Dwight C Tejano
(74) Attorney, Agent, or Firm — Saliwanchik, Lloyd & Eisenschenk

(57) ABSTRACT

Provided is a method of controlling adaptive auto exposure. In the method, a digital photograph captured from an object and a background is divided into an object region where the object is mainly located and a background region where the background is mainly located. Average luminances of the object and background regions are calculated, and a luminance difference between the average luminances of the object and background regions is calculated. If the luminance difference is within a predetermined range, an average luminance of the entire photograph is calculated by applying a weight to the average luminance of the object region, and exposure is controlled based on the calculated average luminance of the entire photograph so as to emphasize the object region.

5 Claims, 3 Drawing Sheets

METHOD OF CONTROLLING ADAPTIVE AUTO EXPOSURE BASED ON ADAPTIVE REGION WEIGHT

CROSS-REFERENCE TO RELATED APPLICATION

This application claims the benefit under 35 U.S.C. §119 of Korean Patent Application No. 10-2011-0063819, filed Jun. 29, 2011, which is hereby incorporated by reference in its entirety.

BACKGROUND

The present disclosure relates to a method of controlling auto exposure of a digital camera, and more particularly, to a method of controlling adaptive auto exposure to emphasize an object by: dividing a digital photograph captured from an object and a background into an object region where the object is mainly located and a background region where the background is mainly located; calculating average luminances of the object and background regions; calculating a luminance difference between the average luminances of the object and background regions; calculating an average luminance of the entire photograph by applying a weight to the average luminance of the object region if the luminance difference is within a predetermined range, and controlling exposure based on the calculated average luminance of the entire photograph.

Improper exposure to light is one of important factors that affect image quality and result in poor-quality photographs. Although new features such as auto gain control algorism are added to recent cameras, such limitation cannot be completely removed.

Therefore are various methods for controlling exposure of digital cameras. However, such methods are not optimal, and thus images may be captured under improper exposure conditions. Particularly, handset devices such as cellular phones may be serious in this limitation. That is, images taken by using such handset devices have poor quality due to improper exposure caused by poor-quality optical devices, no-flash conditions, and no use of precise light adjusting devices.

It may be difficult to determine proper exposure. However, if general conditions are reviewed and the most important region is mainly considered, it may be possible to define optimal exposure based on central values of gray or luminance levels of regions according to situations or perceptions. In any cases, if a dynamic region of a scene is perceptually high, it may be generally difficult to obtain detail information.

Many auto exposure (AE) algorisms have been developed. However, such auto exposure algorisms are inaccurate or complex.

BRIEF SUMMARY

Embodiments provide a method of controlling exposure more accurately and rapidly by using a light sensor.

Embodiments also provide a method of controlling exposure without complexity by using a minimal feedback loop.

In one embodiment, there is provided a method of controlling adaptive auto exposure, the method including: reading an image; dividing the image into an object region and a background region; calculating an average luminance of the object region and an average luminance of the background region; calculating a luminance difference between the average luminance of the object region and the average luminance of the background region; if the luminance difference is within a predetermined range, calculating a weight that is reverse proportional to the luminance difference; calculating an average luminance of the entire image by applying the weight to the average luminance of the objection region; and controlling auto exposure based on the calculated average luminance of the entire image.

According to the embodiment, auto exposure can be optimally controlled under any condition such as a backlight condition, a power illumination condition, and a high contrast condition.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, embodiments will be described in detail with reference to the accompanying drawings.

The exposure of a digital camera can be controlled based on the average luminance of an image. However, if there is a large luminance difference between an object and a background, the camera may be excessively or insufficiently exposed to light from the object.

For example, in a backlight condition, if exposure is controlled based on the average luminance of the entire image, the camera may be insufficiently exposed to light from the object. This may be because the average luminance is mainly determined by the luminance of the background due to the large luminance difference between the object and the background. Therefore, it may be necessary to emphasize the luminance of the object according to the backlight condition.

In most photographic images, the background region is located at the upper part of an image, and the object region is located at the center and lower parts of the image. That is, a photographic image may be divided into two regions: an object region R1 and a background region R2.

Figure 1:
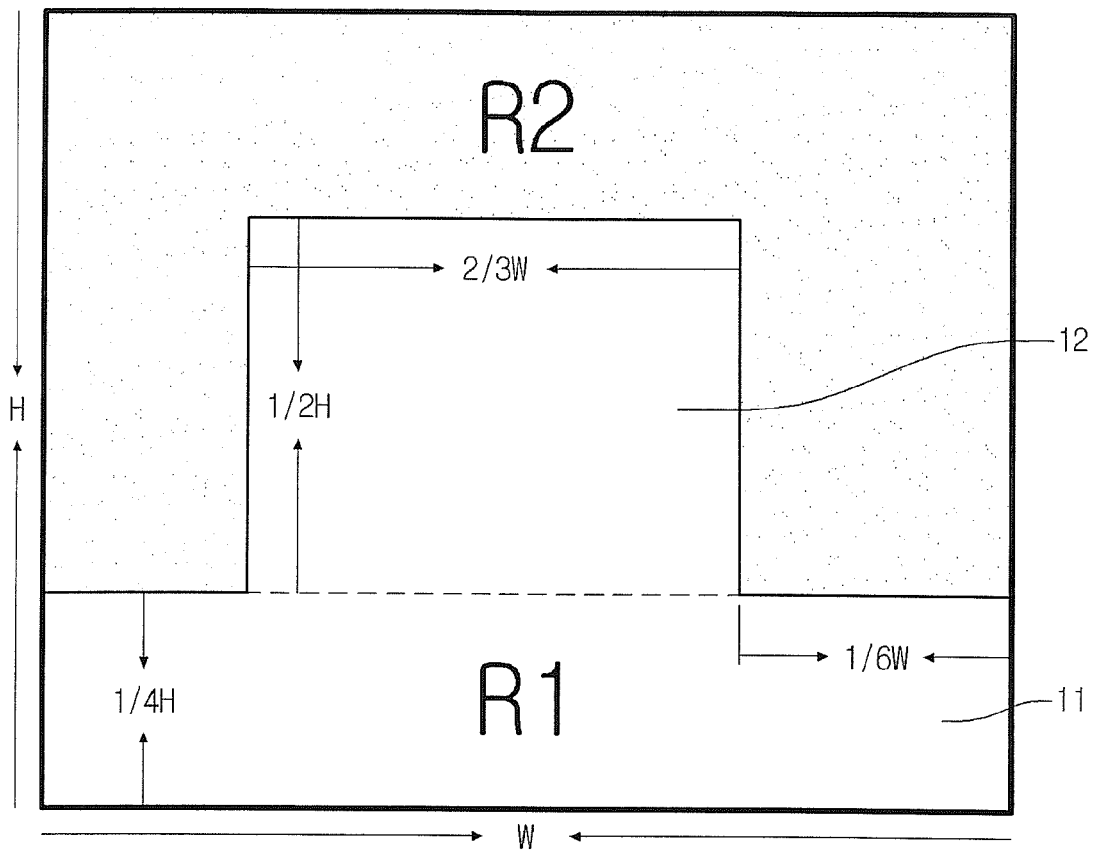
FIG. 1 is a view illustrating an object region and a background region according to en embodiment.

FIG. 1 illustrates regions of an image that are calculated based on empirical analysis on ordinary photographic images.

Referring to FIG. 1, the width of the image is denoted by W, and the height of the image is denoted by H. Then, an object region R1 may be constituted by a first rectangle 11 having a height of ¼H and a width of W and a second rectangle 12 having a height of ½H and a width of ⅔W. A background region R2 may be the other region of the image except for the object region R1.

The definition of the object region R1 and the background region R2 shown in FIG. 1 is exemplary. That is, the object region R1 and the background region R2 may be defined differently according to the kinds of photographs or applications.

As described above, expose control is performed based on the average luminance of the entire image. In an embodiment, the average luminance of the entire image is calculated differently according to the difference between the average luminance of the object region R1 and the average luminance of the background region R2.

A luminance difference LD between the average luminance of the object region R1 and the average luminance of the object region R1 may be calculated by Equation 1.

$$LD = L(R2) - L(R1) \quad \text{(Equation 1)}$$

where L(R2) denotes the average luminance of pixels of the background region R2, and L(R1) denotes the average luminance of pixels of the object region R1.

Figure 2:
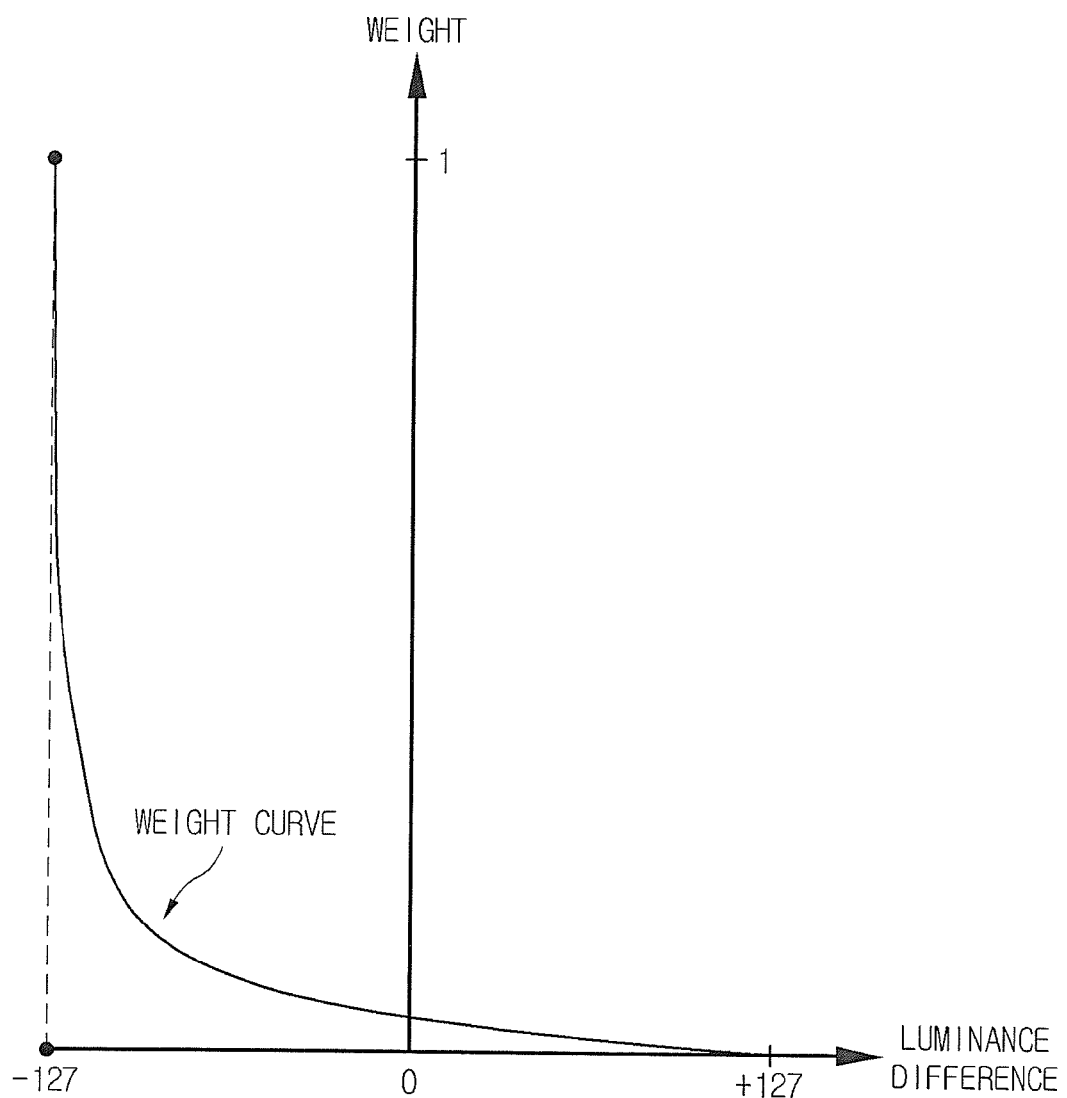
FIG. 2 is a weight reference graph according to an embodiment.

The average luminance of the image may be calculated differently according to the LD. If the luminance difference LD is in a predetermined range, for example, −127<LD<127, the luminance difference LD may not be large between the object region R1 and the background region R2. In this case, a weight may be assigned to the average luminance of the object region R1 to emphasize the object region R1 as shown in FIG. 2. The weight for the object region R1 may range from 0 to 1 in reverse proportion to the luminance difference LD. If the average luminance of the object region R1 is multiplied by a weight ranging from 0 to 1, the average luminance of the entire image is reduced, and exposure may increase.

FIG. 2 is a weight reference graph for emphasizing an object region according to an embodiment.

An average luminance Iavg of an entire image may be calculated by using a weight (w) as shown in Equation 2.

$$Iavg = (L(R2) + L(R1) * w)/2 \quad \text{(Equation 2)}$$

Since the luminance of the object region R1 is higher than the luminance of the background region R2 as the luminance difference LD approaches −127, the weight may be set to a value close to 1 so as to perform exposure control based on the original average luminance of the entire image. On the contrary, as the luminance difference LD approaches +127, since the luminance of the background region R2 is higher than the luminance of the object region R1, the weight is set to a value close to 0 so as to increase exposure.

If the luminance difference LD is out of the range, the luminance of the object region R1 or the background region R2 may be much higher than the luminance of the other. In this case, the average luminance of the brighter region may be set as the average luminance of the entire image.

For example, if the luminance difference LD≤−127, the average luminance of the object region R1 may be set as the average luminance of the entire image. If the luminance difference LD≥127, the average luminance of the background region R2 may be set as the average luminance of the entire image.

Figure 3:
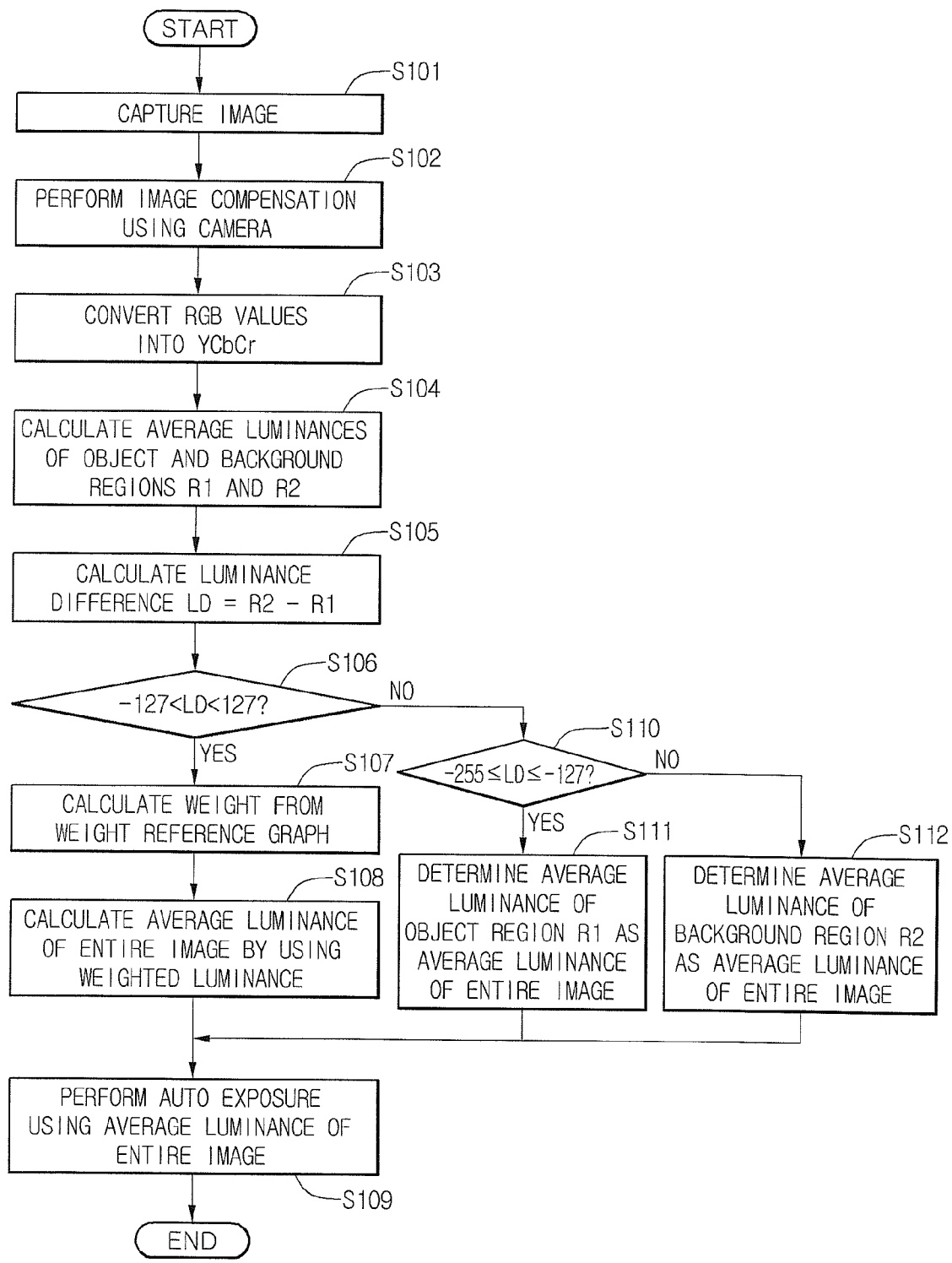
FIG. 3 is a flowchart for explaining a method of controlling adaptive auto exposure.

FIG. 3 is a flowchart for explaining a method of controlling adaptive auto exposure.

In operation S101, an image is captured, or image data are read from a storage medium of a camera. In operation S102, the camera performs image compensation such as lens shading compensation, black level adjustment, and sensor linearity checking and interpolation. After the image compensation, RGB values of the image are input to an exposure compensation algorism.

In operation S103, the RGB values are converted into YCbCr values, and Y values of pixels of the image are extracted.

In operation S104, the average luminances of regions R1 and R2 (refer to FIG. 1) of the image are calculated. In operation S105, the difference LD between the average luminances of the regions R1 and R2 is calculated.

In operation S106, it is determined whether −127<LD<127. If so, in operation S107, a weight for the average luminance of the region R1 is calculated using the weight reference graph of FIG. 2. Then, in operation S108, the average luminance of the entire image is calculated by applying the weight to the average luminance of the region R1. That is, the average luminance of the entire image is calculated by Equation 2.

$$AL \text{ (average luminance)} = (L(R2) + L(R1) * w)/2 \quad \text{(Equation 2)}$$

where L(R2) denotes the average luminance of the region R2, L(R1) denotes the average luminance of the region R1, and w denotes a weight obtained from the weight reference graph of FIG. 2 for the average luminance L(R1) of the region R1.

In operation S109, auto expose control is performed using the calculated average luminance AL.

In operation S110, it is determined whether the luminance difference LD≤−127. If so, the average luminance of the object region R1 is set as the average luminance of the entire image in operation S111, and auto expose control is performed using the average luminance of the entire image in operation S109.

If the luminance difference LD>127, the average luminance of the background region R2 is set as the average luminance of the entire image in operation S112, and auto expose control is performed using the average luminance of the entire image in operation S109.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling adaptive auto exposure, the method comprising:
    reading an image;
    dividing the image into an object region and a background region;
    calculating an average luminance of the object region and an average luminance of the background region;
    calculating a luminance difference between the average luminance of the object region and the average luminance of the background region;
    if the luminance difference is within a predetermined range, calculating a weight that is reverse proportional to the luminance difference;
    calculating an average luminance of the entire image by applying the weight to the average luminance of the object region;

if the luminance difference is not within the predetermined range, determining the average luminance of the background region or the object region as the average luminance of the entire image; and controlling auto exposure based on the average luminance of the entire image.

2. The method according to claim 1, wherein the predetermined range is greater than −127 but smaller than 127.

3. The method according to claim 2, wherein if the luminance difference is equal to or smaller than −127, determining the average luminance comprises determining the average luminance of the object region as the average luminance of the entire image.

4. The method according to claim 2, wherein if the luminance difference is equal to or greater than 127, determining the average luminance comprises determining the average luminance of the background region as the average luminance of the entire image.

5. The method according to claim 1, wherein the calculating of the average luminance of the object region and the average luminance of the background region comprises:

converting RGB values of the image into YCbCr values;

extracting Y values; and calculating an arithmetical mean of the Y values of the object region and an arithmetical mean of the Y values of the background region.

\* \* \* \* \*